(12) United States Patent
Diedrich et al.

(10) Patent No.: US 10,748,012 B2
(45) Date of Patent: Aug. 18, 2020

(54) METHODS AND APPARATUS TO FACILITATE ENVIRONMENTAL VISIBILITY DETERMINATION

(71) Applicant: Ford Global Technologies, LLC, Dearborn, MI (US)

(72) Inventors: Jonathan Diedrich, Carleton, MI (US); Eric L. Reed, Livonia, MI (US); Adil Nizam Siddiqui, Farmington Hills, MI (US); Mark Gehrke, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 15/895,675

(22) Filed: Feb. 13, 2018

(65) Prior Publication Data
US 2019/0251371 A1    Aug. 15, 2019

(51) Int. Cl.
*G06K 9/00* (2006.01)
*B60Q 9/00* (2006.01)
*G08G 1/16* (2006.01)
*G06F 3/0484* (2013.01)

(52) U.S. Cl.
CPC ......... *G06K 9/00798* (2013.01); *B60Q 9/008* (2013.01); *G06F 3/0484* (2013.01); *G06K 9/00993* (2013.01); *G08G 1/167* (2013.01)

(58) Field of Classification Search
CPC .............................................. G06K 9/00798
See application file for complete search history.

(56) References Cited

U.S. PATENT DOCUMENTS

| 4,970,653 | A | 11/1990 | Kenue |
| 6,807,287 | B1 * | 10/2004 | Hermans ............... G06T 7/73 382/104 |
| 7,184,073 | B2 | 2/2007 | Varadarajan et al. |
| 8,487,991 | B2 | 7/2013 | Zhang et al. |
| 9,669,829 | B2 | 6/2017 | Shimomura et al. |

(Continued)

FOREIGN PATENT DOCUMENTS

| JP | 2017117105 A | 6/1917 |
| KR | 101268473 B1 | 6/2013 |

OTHER PUBLICATIONS

Schreiber et al., "Single camera lane detection and tracking", Proceedings of the 8th International IEEE Conference on Intelligent Transportation Systems, Vienna, Austria, Sep. 13-16, 2005, pp. 1114-1119 (Year: 2005).*

(Continued)

*Primary Examiner* — Nay A Maung
*Assistant Examiner* — Jose M Torres
(74) *Attorney, Agent, or Firm* — Frank Lollo; Eversheds Sutherland (US) LLP

(57) ABSTRACT

Methods and apparatus are disclosed to facilitate environmental visibility determination. An example vehicle comprises a sensor and a processor and memory. The sensor is to generate road image information. The processor and memory are in communication with the sensor and are configured to: detect vanishing points of lane markings in the road image information, convert an average pixel row value of the vanishing points to a distance value, and if the distance value is below a threshold, stop execution of at least one road condition monitoring feature.

20 Claims, 7 Drawing Sheets

(56) References Cited

U.S. PATENT DOCUMENTS

| | | | |
|---|---|---|---|
| 2001/0028729 A1* | 10/2001 | Nishigaki | G06K 9/00201 382/104 |
| 2004/0201672 A1* | 10/2004 | Varadarajan | H04N 7/183 348/148 |
| 2007/0230800 A1* | 10/2007 | Miyahara | G06K 9/00798 382/224 |
| 2010/0054538 A1* | 3/2010 | Boon | G06K 9/00798 382/104 |
| 2010/0238283 A1* | 9/2010 | Kim | B60W 50/16 348/135 |
| 2012/0072080 A1* | 3/2012 | Jeromin | B60Q 1/143 701/49 |
| 2013/0141520 A1* | 6/2013 | Zhang | G06K 9/4638 348/36 |
| 2013/0342692 A1* | 12/2013 | Li | G01N 21/538 348/143 |
| 2014/0180497 A1* | 6/2014 | Kojima | G06K 9/00798 701/1 |
| 2015/0204687 A1* | 7/2015 | Yoon | G01C 21/3658 701/436 |
| 2017/0308760 A1* | 10/2017 | Kwon | G06T 7/11 |
| 2018/0165822 A1* | 6/2018 | Uliyar | G06T 7/55 |
| 2019/0034740 A1* | 1/2019 | Kwant | G06K 9/00798 |

OTHER PUBLICATIONS

Pomerleau, "Visibility Estimation From a Moving Vehicle Using the RALPH Vision System", Proceedings of Conference on Intelligent Transportation Systems, Nov. 12, 1997, pp. 906-911 (Year: 1998).*

Young-Woo Seo et al, *Detection and Tracking of the Vanishing Point on a Horizon for Automotive Applications*, GM-CMU Autonomous Driving Collaborative Research Lab Carnegie Mellon University, 41 pages.

* cited by examiner

606

| Pixel Row | Distance |
|-----------|----------|
| 200 | 2.5 |
| 500 | 8 |
| 750 | 20 |
| 850 | 50 |
| 900 | ∞ |

FIG. 6

METHODS AND APPARATUS TO FACILITATE ENVIRONMENTAL VISIBILITY DETERMINATION

TECHNICAL FIELD

The present disclosure generally relates to road conditions monitoring vehicle features and, more specifically, environmental visibility determination.

BACKGROUND

In recent years, vehicles have been equipped with road conditions monitoring vehicle features such as front and rear cameras, ultrasonic sensors, rain sensors, etc. Road conditions monitoring vehicle features often make vehicles more enjoyable to drive, alert drivers to potential road obstructions, and/or engage windshield wipers of vehicles. Information from road conditions monitoring vehicle features is often presented to a driver via an interface of a vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle is disclosed. The vehicle comprises a sensor and a processor and memory. The sensor is to generate road image information. The processor and memory are in communication with the sensor and are configured to: detect vanishing points of lane markings in the road image information, convert an average pixel row value of the vanishing points to a distance value, and if the distance value is below a threshold, stop execution of at least one road condition monitoring feature.

An example method is disclosed. The method comprises: generating, with a sensor, road image information; and detecting, with the processor, vanishing points of lane markings in the road image information; converting, with the processor, an average pixel row value of the vanishing points to a distance value; and stopping, with the processor, execution of at least one road condition monitoring feature if the distance value is below a threshold.

An example system is disclosed. The system comprises a central facility, a dedicated short range communication (DSRC) transceiver, a sensor, a global positioning system (GPS) receiver, and a processor. The central facility has a database of visibility information. The DSRC transceiver is disposed in a vehicle and in communication with the database. The sensor is disposed in the vehicle and generates road image information. The GPS receiver is disposed in the vehicle and generates location information of the vehicle. The processor is in communication with the DSRC transceiver, the sensor, and the GPS receiver. The processor is configured to: detect vanishing points of lane markings in the road image information, convert an average pixel row value of the vanishing points to a distance value, and if the distance value is below a threshold, stop execution of at least one road condition monitoring feature.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 6 is a look-up table stored in a memory of the electronic components of FIG. 4.

DETAILED DESCRIPTION OF EXAMPLE EMBODIMENTS

Figure 1:
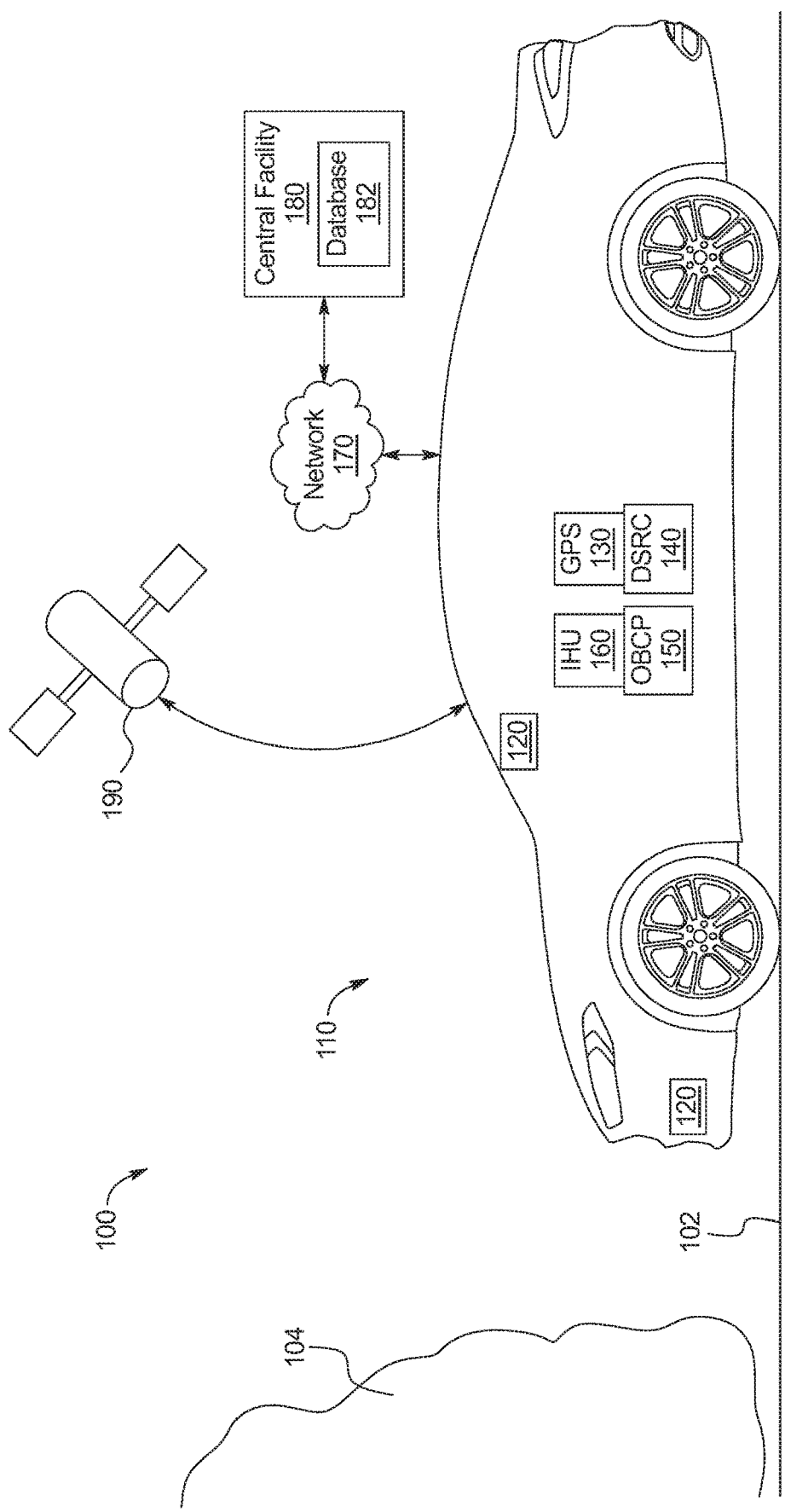
FIG. 1 illustrates a vehicle operating in accordance with the teachings of this disclosure in an environment.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Road conditions monitoring vehicle features include adaptive cruise control (ACC), lane detection, automated braking, forward collision warning, and rain detection, among others. ACC maintains a set vehicle speed and reduces vehicle speed to maintain a safe distance from other detected vehicles. Lane detection detects lane markings of a roadway to alert a driver when the driver's vehicle is veering off the roadway (e.g., if the driver is drowsy). Automated braking automatically slows a vehicle when a pedestrian or other obstruction is detected in front of a vehicle. Forward collision warning warns a driver of a potential collision with an object in front of the vehicle. Rain detection detects precipitation and automatically engages windshield wipers of a vehicle.

Traditionally, some road conditions monitoring vehicle features utilize image data from one or more cameras mounted on the vehicle. In some instances, the cameras produce poor image data due to low visibility in the environment around the vehicle. In such instances, camera-dependent road conditions monitoring vehicle features may continue to function, but may not accurately detect road obstructions. In these instances, a vehicle may collide with a road obstruction if the driver believes the road conditions monitoring feature is operating normally.

This disclosure provides methods and apparatus to detect low environmental visibility about a vehicle and to provide warnings related to road conditions monitoring features affected by the low visibility. By providing visibility warnings, a driver may increase his or her vigilance for potential obstructions along a roadway, adopt a slower vehicle speed, and/or pull over until environmental visibility improves.

FIG. 1 illustrates a vehicle 110 operating in accordance with the teachings of this disclosure in an environment 100.

Figure 2:
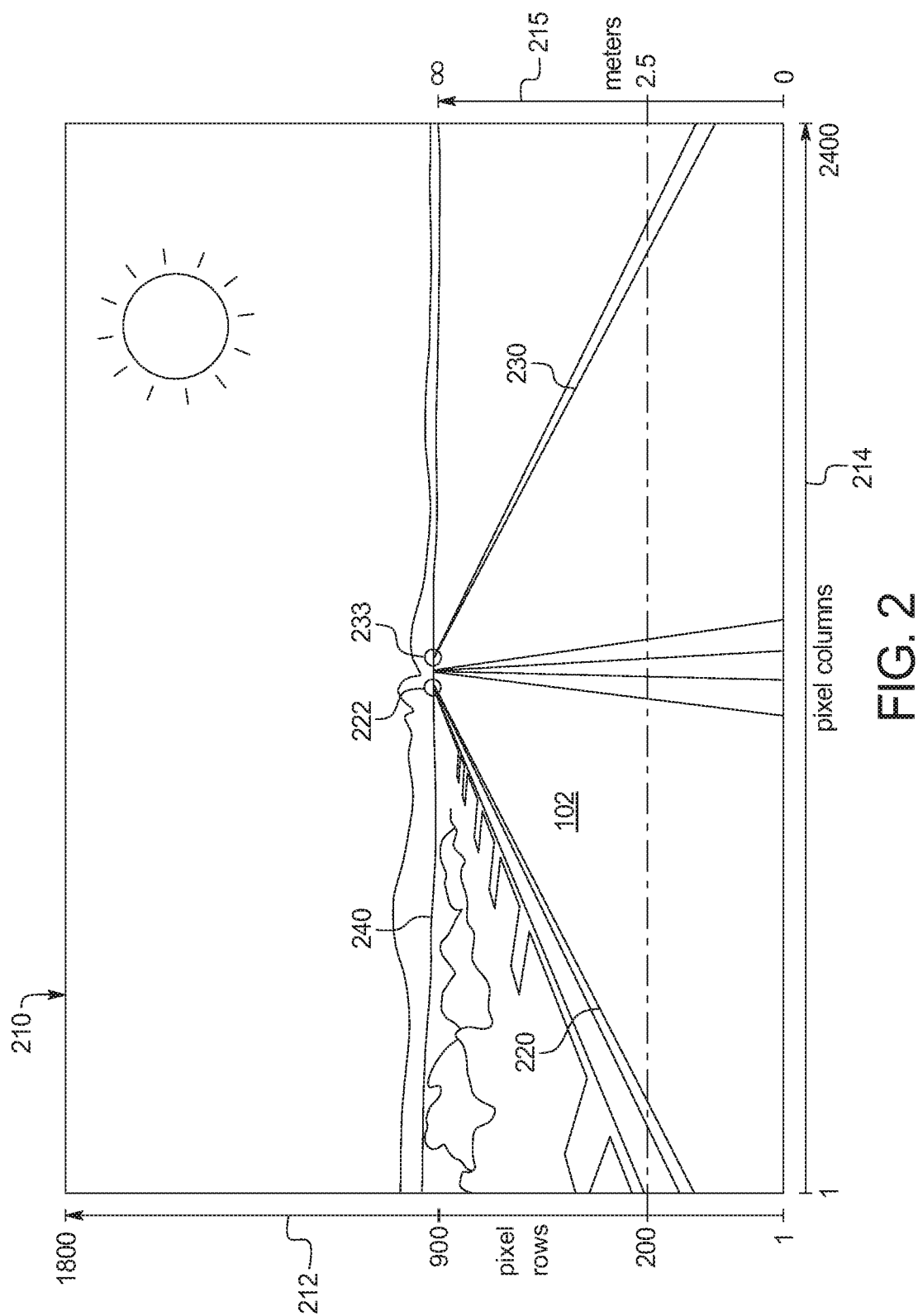
FIG. 2 is an image of a roadway of FIG. 1 captured by a sensor of the vehicle of FIG. 1.
Figure 3:
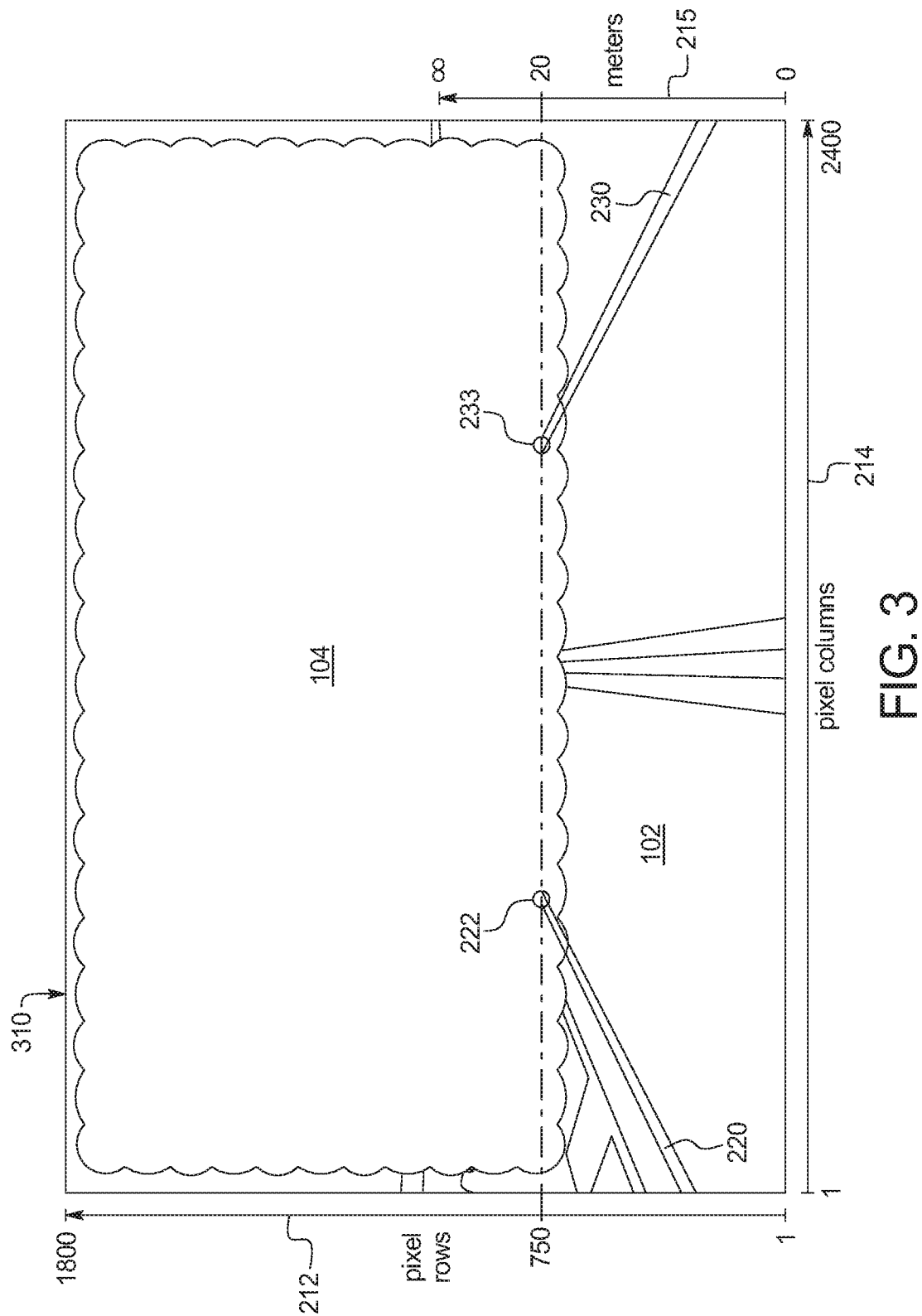
FIG. 3 is another image of the roadway captured by the sensor of the vehicle.

FIG. 2 is an image 210 of a roadway 102 of FIG. 1 captured by a sensor 120 of the vehicle 110. FIG. 3 is a second image 310 of the roadway 102 captured by the sensor 120 of the vehicle 110.

As shown in FIG. 1, the environment 100 includes the roadway 102, a fog bank 104, the vehicle 110, a network 170, a central facility 180, and a global positioning system (GPS) satellite 190. The central facility 180 includes a database 182.

The vehicle 110 may be a standard gasoline powered vehicle, a hybrid vehicle, an electric vehicle, a fuel cell vehicle, and/or any other mobility implement type of vehicle. The vehicle 110 includes parts related to mobility, such as a powertrain with an engine, a transmission, a suspension, a driveshaft, and/or wheels, etc. The vehicle 110 may be non-autonomous, semi-autonomous (e.g., some routine motive functions controlled by the vehicle 110), or autonomous (e.g., motive functions are controlled by the vehicle 110 without direct driver input). As shown in FIG. 1 the vehicle 110 includes sensors 120, a GPS receiver 130, a dedicated short range communication (DSRC) transceiver 140, an on board computing platform (OBCP) 150, and an infotainment head unit (IHU) 160.

The vehicle 110 is in communication with the GPS satellite 190 via the GPS receiver 130. The vehicle 110 is in communication with the central facility 180 via the DSRC transceiver 140 and the network 170. In some examples, the network 170 is a cellular communications network.

The sensors 120 may be arranged in and around the vehicle 110 in any suitable fashion. The sensors 120 may be mounted to measure properties around the exterior of the vehicle 110. Additionally, some sensors 120 may be mounted inside the cabin of the vehicle 110 or in the body of the vehicle 110 (such as, the engine compartment, the wheel wells, etc.) to measure properties in the interior of the vehicle 110. For example, such sensors 120 may include accelerometers, odometers, tachometers, pitch and yaw sensors, wheel speed sensors, microphones, tire pressure sensors, and biometric sensors, etc. In the illustrated example, the sensors 120 are a camera, lidar, and radar. In some examples, the sensors 120 are mounted at the front of the vehicle 110. In some examples, the sensors 120 are mounted on a windshield of the vehicle 110. In some such examples, the sensors 120 are mounted within a rearview mirror of the vehicle 110. The sensors 120 capture image data of the roadway 102 about the vehicle 110. In some examples, the image data is processed by the OBCP 150 to detect road obstructions and/or lane markings to support roadway condition monitoring features. In other words, the sensors 120 generate roadway image information for the vehicle 110.

The GPS receiver 130 generates location information of the vehicle 110 based on communications with the GPS satellite 190. In some examples, location information of the vehicle 110 is transmitted to the central facility 180 via the DSRC transceiver for storage in the database 182.

The example DSRC transceiver 140 includes antenna(s), radio(s) and software to broadcast messages and to establish connections between the vehicle 110, infrastructure-based modules (e.g., the central facility 180), and mobile device-based modules (e.g., cellular telephones, tablets, smartphones, etc.). In some examples, the vehicle 110 transmits visibility information detected by the sensors 120 and determined by the OBCP 150 to the central facility 180. More information on the DSRC network and how the network may communicate with vehicle hardware and software is available in the U.S. Department of Transportation's Core June 2011 System Requirements Specification (SyRS) report, which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as GPS, Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like (e.g., V2X). Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The OBCP 150 controls various subsystems of the vehicle 110. In some examples, the OBCP 150 controls power windows, power locks, an immobilizer system, and/or power mirrors, etc. In some examples, the OBCP 150 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In some examples, the OBCP 150 processes information from the sensors 120 to execute and support roadway conditions monitoring features. Using roadway image information provided by the sensors 120, the OBCP 150 determines whether to warn a driver of the vehicle 110 of low environmental visibility, disengage camera-dependent road conditions monitoring features (e.g., ACC, automated braking, forward collision warning, etc.), and/or to warn the driver that the camera-dependent road conditions monitoring features have been disengaged, as will be explained in greater detail below. In some examples, visibility information determined by the OBCP 150 is transmitted to the central facility 180 via the DSRC transceiver 140 for storage in the database 182.

The infotainment head unit 160 provides an interface between the vehicle 110 and a user. The infotainment head unit 160 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 160 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 160 displays the infotainment system on, for example, the center console display.

In the illustrated example of FIG. 2, the first image 210 of the roadway 102 was captured by the sensors 120 during clear weather. Thus, as shown in FIG. 2, visibility in the first image 210 extends to a horizon 240. In the illustrated example of FIG. 3, the second image 310 of the roadway 102 was captured by the sensors 120 during low-visibility weather (e.g., fog, rain, snow, etc.). As shown in FIG. 3, the second image 310 is partially obscured by the fog bank 104.

The first and second images 210, 310 are composed of pixels arranged in multiple pixel rows 212 and multiple pixel columns 214. In the examples of FIGS. 2 and 3, the pixel rows 212 are numbered from 1 to 1800. In the examples of FIGS. 2 and 3, the pixel columns 214 are numbered from 1 to 2400. Thus, individual pixels in the first and second images 210, 310 have a pixel row value and a pixel column value. In other words, the pixel row and column values operate as two-dimensional (2D) coordinates in the first and second images 210, 310. In yet other words, the first and second images 210, 310 are in a 2D Cartesian reference frame where the pixel column values act as "x" coordinates and the pixel row values act as "y" coordinates. Pixel row and column coordinates are sometimes referred to as being in a pixel domain.

As shown in the examples of FIGS. 2 and 3, the pixel row values 212 in the first and second images 210, 310 correspond non-linearly to distance values 215 in front of the vehicle 110. Distance values are sometimes referred to as being in a distance domain (e.g., the real world). Thus, as shown in the example of FIG. 2, pixels included in the pixel row 212 having a value of "200" depict a line of locations on the roadway 102 that are "2.5 meters" in front of the vehicle 110. It should be understood and appreciated that correspondence between the pixel rows 212 and the distances 215 is dependent on the placement and orientation of the sensors 120 in the vehicle 110. This correspondence between the pixel row values 212 and the distance values 215 is calibrated into the OBCP 150, will be explained in greater detail below in conjunction with FIGS. 4, 5, and 6.

As shown in FIGS. 2 and 3, the roadway 102 includes first and second lane markings 220 and 230. As the vehicle 110 travels along the roadway 102, the first lane marking 220 is at a driver's left side and the second lane marking 230 is at the driver's right side. Thus, the first and second lane markings 220, 230 may be referred to as left and right lane markings 220, 230. As shown in FIGS. 2 and 3, the first and second lane markings 220, 230 respectively have first and second vanishing points 222, 233 where the first and second lane markings 220, 230 are no longer visible in front of the vehicle to the sensor 120.

In the clear weather example of FIG. 2, the first and second lane markings 220, 230 extend to the horizon 240. Thus the first and second vanishing points 222, 233 are located immediately next to one another on the horizon 240. Further, for the example of FIG. 2, the first and second vanishing points 222, 233 thus each have a pixel row value of approximately 900. As shown in the example of FIG. 2, a pixel row value of 900 corresponds to an infinite distance in front of the vehicle 110.

In the low-visibility weather example of FIG. 3, the first and second lane markings 220, 230 are partially obscured by the fog bank 104. Thus the first and second vanishing points 222, 233 are substantially located in the fog bank 104 where the first and second lane markings 220, 230 are no longer visible. Further, for the example of FIG. 3, the first and second vanishing points 222, 233 thus each have a pixel row value of approximately 750. As shown in the example of FIG. 2, a pixel row value of 750 corresponds to 20 meters in front of the vehicle 110.

Figure 4:
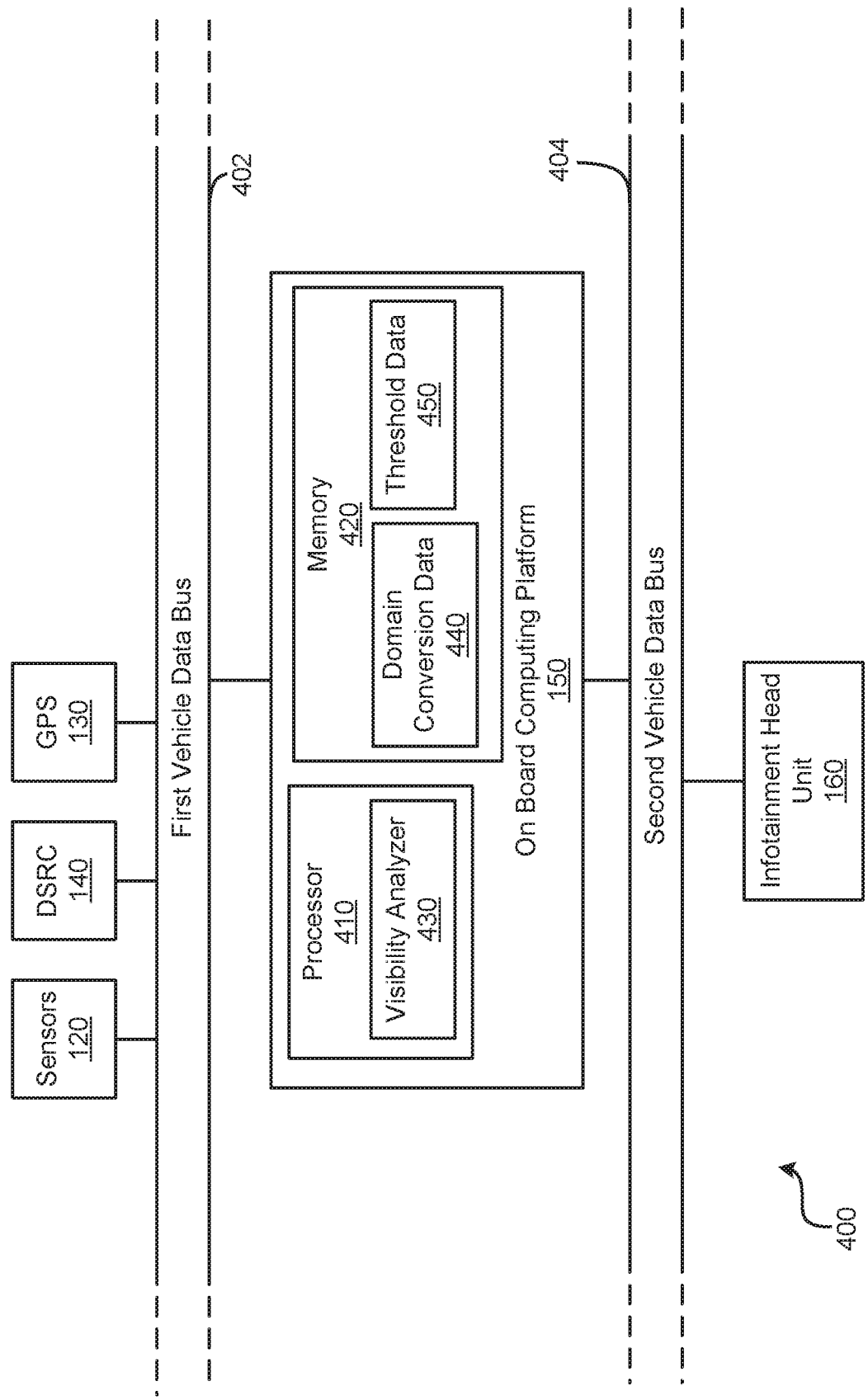
FIG. 4 is a block diagram of the electronic components of the vehicle of FIG. 1.
Figure 5:
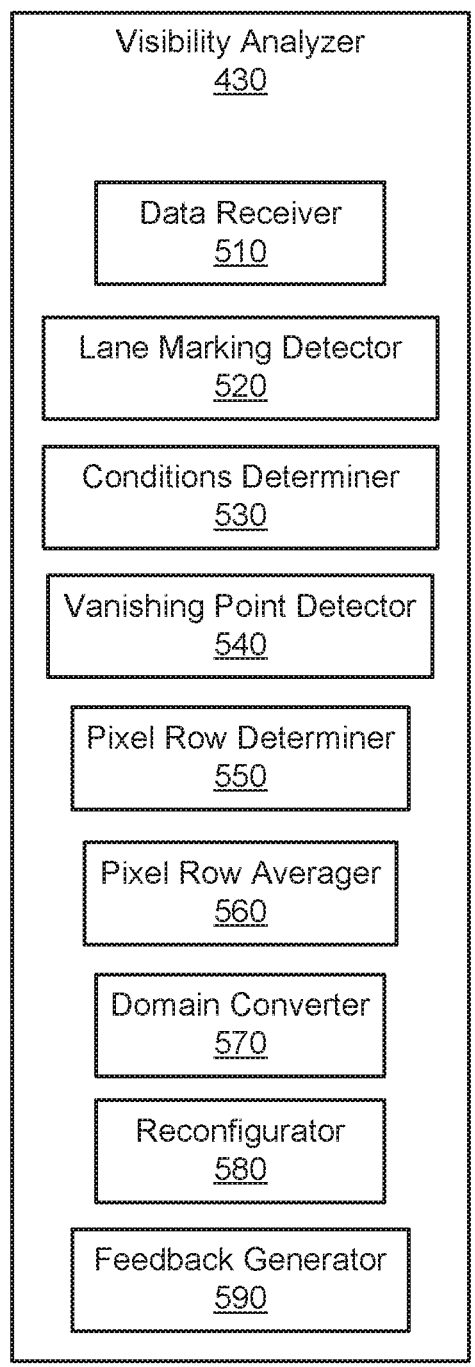
FIG. 5 is a more detailed block diagram of the visibility analyzer of FIG. 4.

FIG. 4 is a block diagram of the electronic components 400 of the vehicle 110 of FIG. 1. FIG. 5 is a more detailed block diagram of a visibility analyzer 430 of the electronic components 400. FIG. 6 is a look-up table 606 stored in a memory 420 of the electronic components 400.

As shown in FIG. 4, the first vehicle data bus 402 communicatively couples the sensors 120, the GPS receiver 130, the DSRC transceiver 140, the OBCP 150, and other devices connected to the first vehicle data bus 402. In some examples, the first vehicle data bus 402 is implemented in accordance with the controller area network (CAN) bus protocol as defined by International Standards Organization (ISO) 11898-1. Alternatively, in some examples, the first vehicle data bus 402 may be a Media Oriented Systems Transport (MOST) bus, or a CAN flexible data (CAN-FD) bus (ISO 11898-7). The second vehicle data bus 404 communicatively couples the OBCP 150 and the infotainment head unit 160. The second vehicle data bus 404 may be a MOST bus, a CAN-FD bus, or an Ethernet bus. In some examples, the OBCP 150 communicatively isolates the first vehicle data bus 402 and the second vehicle data bus 404 (e.g., via firewalls, message brokers, etc.). Alternatively, in some examples, the first vehicle data bus 402 and the second vehicle data bus 404 are the same data bus.

The OBCP 150 includes a processor or controller 410 and memory 420. In the illustrated example, the OBCP 150 is structured to include the visibility analyzer 430. Alternatively, in some examples, the visibility analyzer 430 may be incorporated into another electronic control unit (ECU) with its own processor 410 and memory 420. In operation, the visibility analyzer 430 determines whether road conditions and/or geometry permit visibility determination, whether the visibility about the vehicle 110 is low, whether to disengage road conditions monitoring features, and whether to present warning messages to the driver based on road image information from the sensors 120. The processor or controller 410 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 420 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 420 includes multiple kinds of memory, particularly volatile memory and non-volatile memory.

The memory 420 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 420, the computer readable medium, and/or within the processor 410 during execution of the instructions. The memory 420 stores the domain conversion data 440 and threshold data 450.

In some examples, the domain conversion data 440 includes the look up table 606. As shown in FIG. 6, the look up table 606 corresponds pixel row values 610 to distance values 620 for the vehicle 110. In other words, the look up table 606 provides conversions between the pixel domain and the distance domain that are calibrated for the vehicle 110. As shown in the examples of FIGS. 2 and 6, the $200^{th}$ pixel row 212 in the first and second images 210, 310 corresponds to a distance 2.5 meters in front of the vehicle 110 on the roadway 102. As shown in the examples of FIGS. 2 and 6, the $750^{th}$ pixel row 212 in the first and second images 210, 310 corresponds to a distance 20 meters in front of the vehicle 110 on the roadway 102. FIG. 6 shows additional examples of pixel domain and distance domain correspondences for the $500^{th}$, $850^{th}$, and $900^{th}$ pixel rows 212 of the first and second images 210, 310. It should be understood and appreciated that the look up table 606 depicted in FIG. 6 is an abridged example and that a look up table stored in the memory 420 may include pixel to distance correspondences for each pixel row 212 (e.g., $1^{st}$ through $1800^{th}$) of images captured by the sensors 120. It should also be understood that the look up table 606 may be updated based on the placement and orientation of the sensors 120 in the vehicle 110 and characteristics (e.g. field of view, focal depth, etc.) of the sensors 120.

In some examples, the domain conversion data 440 includes a pixel domain to distance domain conversion equation such as the example Equation 1, below. The pixel domain to distance domain conversion equation translates pixel row values y to distance values x and vice-versa. It should be understood that Equation 1 is an example and that the pixel domain to distance domain conversion equation may be updated based on the placement and orientation of the sensors 120 in the vehicle 110 and characteristics of the sensors 120.

$$y=0.737e^{0.0051x} \quad \text{Equation 1}$$

Referring to FIG. 4, in some examples, the domain conversion data 440 is programmed into the OBCP 150 during production of the vehicle 110. The domain conversion data 440 may be periodically updated during service of the vehicle 110 to reflect changes in placement and/or orientation of the sensors 120. For example, the domain conversion data 440 may be updated if the suspension of the vehicle 110 is adjusted to change the ride height of the vehicle 110. For example, in an instance where the vehicle 110 is a rear wheel drive sports car (e.g., a Mustang), the domain conversion data 440 may be updated if larger rear wheel and tire assemblies are mounted to the vehicle 110. The threshold data 450 may include threshold values in the pixel domain and/or in the distance domain related to low visibility.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

As shown in FIG. 5, the visibility analyzer 430 includes a data receiver 510, a lane marking detector 520, a conditions determiner 530, a vanishing point detector 540, a pixel row determiner 550, a pixel row averager 560, a domain converter 570, a reconfigurator 580, and a feedback generator 590.

In operation, the data receiver 510 receives road image information sent by the sensors 120. More specifically, the data receiver 510 receives images of the roadway 102 captured by the sensors 120.

In operation, the lane marking detector 520 detects the first and second lane markings 220, 230 as the vehicle 110 travels along the roadway 102 based on the road image information received from the sensors 120 via the data receiver 510. More specifically, the lane marking detector 520 analyzes the road image information to locate the first and second lane markings 220, 230 in images captured by the sensors 120 (e.g., the first and second images 210, 310). In other words, the lane marking detector 520 determines whether the lane markings of the roadway 102 are detectable. In some examples, the lane marking detector 520 uses edge detection to find the first and second lane markings 220, 230 in the images captured by the sensors 120.

In operation, the conditions determiner 530 determines whether the roadway 102 is suitable for a visibility determination based on the road image information received via the data receiver 510 and the detected lane markings received from the lane markings detector 520. More specifically, the conditions determiner 530 analyzes the road image information received via the data receiver 510 and the detected lane markings to determine whether the roadway 102 is curved and whether the roadway 102 is inclined. In instances where the roadway 102 is curved and/or inclined a visibility determination may not possible.

In operation, the vanishing point detector 540 detects the first and second vanishing points 222, 233 based on the detected first and second lane markings 220, 230 received from the lane marking detector 520 and the road image information from the sensors 120 received via the data receiver 510. More specifically, the vanishing point detector 540 locates the end points of the first and second lane markings 220, 230 in images captured by the sensors 120. In some examples, the vanishing point detector 540 uses edge detection to find the first and second vanishing points 222, 233 in the images captured by the sensors 120.

In operation, the pixel row determiner 550 determines in which pixel rows 212 the first and second vanishing points 222, 233 are respectively located in the images captured by the sensors 120. More specifically, the pixel row determiner 550 determines the pixel row values of the first and second vanishing points 222, 233. It should be understood that the first and second vanishing points 222, 233 may be located in differing pixel rows (e.g., at different heights in the images captured by the sensors 120).

In operation, the pixel row averager 560 averages the pixel row values of the first and second vanishing points 222, 233 received from the pixel row determiner 550. More specifically, the pixel row averager 560 generates an average pixel row value based on the respective pixel row values of the first and second vanishing points 222, 233.

In operation, the domain converter 570 converts the average pixel row value received from the pixel row averager 560 into a distance value in the distance domain. More specifically, the domain converter 570 accesses the domain conversion data 440 (e.g., the look up table 606, Equation 1, etc.) stored in the memory 420 and determines the distance value corresponding to determined average pixel value using the domain conversion data 440. In other words, the domain converter 570 translates the average pixel value from pixel domain into the corresponding distance value in the distance domain. Thus, average height location of the first and second vanishing points 222, 233 in images captured by the sensors 120 is converted into real-world distances on the roadway 102 in front of the vehicle 110.

In operation, the reconfigurator 580 determines whether to reconfigure camera-dependent road conditions monitoring features (e.g., ACC, automated braking, forward collision warning, etc.) based on the average pixel value received from the pixel row averager 560 and/or the determined distance value received from the domain converter 570. More specifically, the reconfigurator 580 accesses the threshold data 450 stored in the memory 420 and compares the average pixel value and/or the determined distance value to the threshold data 450. In some examples, the reconfigurator 580 determines whether the average pixel value is below a pixel value visibility threshold in the pixel domain. In some examples, the reconfigurator 580 determines whether the determined distance is below a distance value visibility threshold in the distance domain. In other words, the reconfigurator 580 determines whether the average location of the first and second vanishing points 222, 233 is too close to the vehicle 110 by comparing the average pixel value and/or the determined distance value to domain-corresponding visibility thresholds. If the average pixel value and/or the determined distance are below their respective visibility thresholds, the reconfigurator 580 generates a stop request to cease or suspend execution of the camera-dependent road conditions monitoring vehicle features.

In operation the feedback generator 590 generates feedback based on the stop request received from the reconfigurator 580, the comparison of the average pixel value to the threshold data 450 from the reconfigurator 580 and/or the comparison of the determined distance value to the threshold data 450 received from the reconfigurator 580. More specifically the feedback generator 590 generates messages warning a driver of the vehicle 110 of low visibility and/or that one or more road conditions monitoring vehicle features is unavailable for use. Further, the feedback generator 590 sends the messages for display on the IHU 160.

Figure 7:
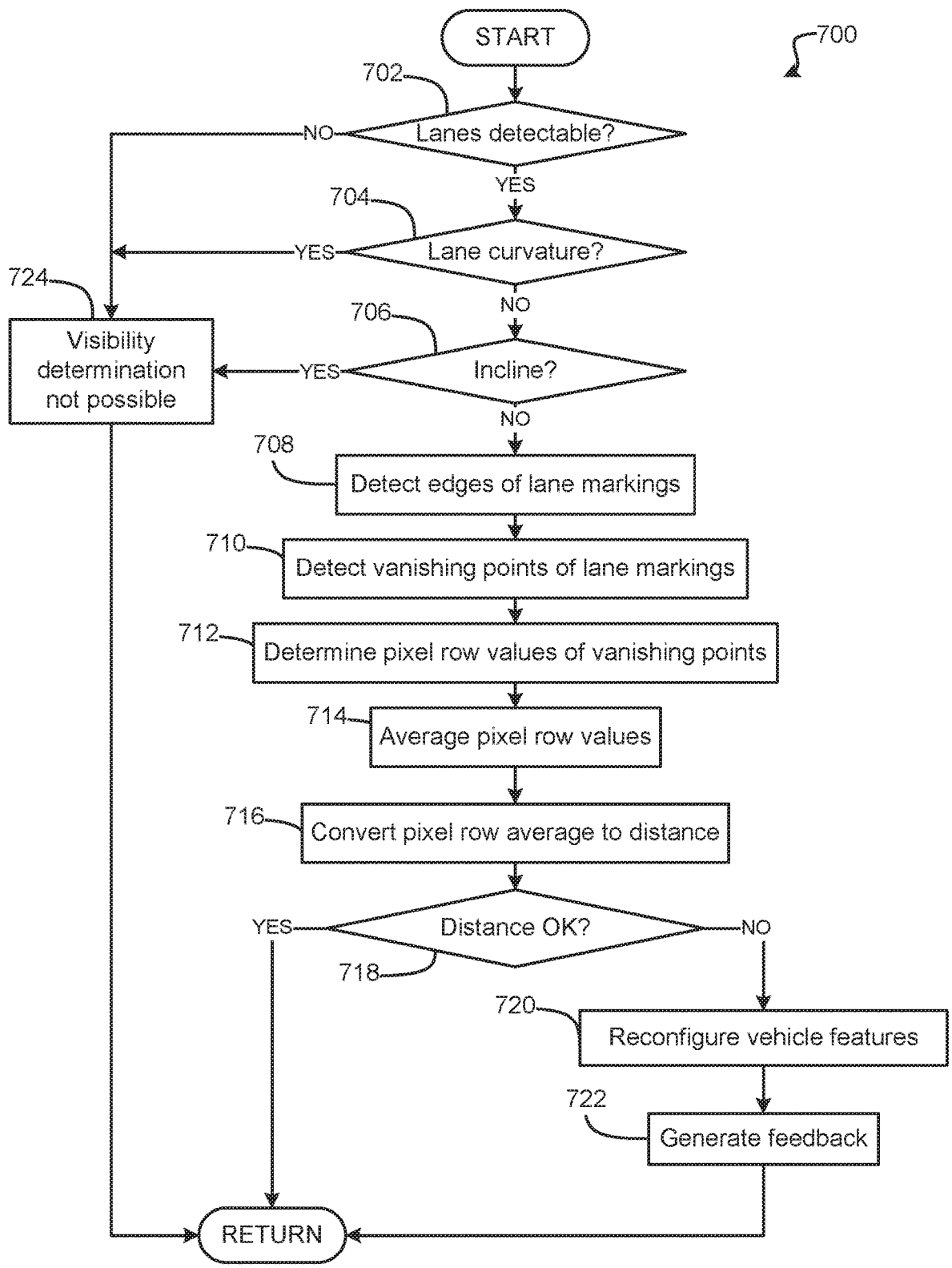
FIG. 7 is a flowchart of a method to analyze environmental visibility about the vehicle of FIG. 1, which may be implemented by the electronic components of FIG. 4.

FIG. 7 is a flowchart of a method 700 to analyze environmental visibility about the vehicle of FIG. 1, which may be implemented by the electronic components 400 of FIG. 4. The flowchart of FIG. 7 is representative of machine readable instructions stored in memory (such as the memory 420 of FIG. 4) that comprise one or more programs that, when executed by a processor (such as the processor 410 of FIG. 4), cause the vehicle 110 to implement the example visibility analyzer 430 of FIGS. 4 and 5. Further, although the example program(s) is/are described with reference to the flowchart illustrated in FIG. 7, many other methods of implementing the example visibility analyzer 430 may alternatively be used. For example, the order of execution of the blocks may be changed, and/or some of the blocks described may be changed, eliminated, or combined.

Initially, at block 702, the lane markings detector 520 determines whether the first and second lane markings 220, 230 are detectable as the vehicle 110 travels along the roadway 102. As discussed above, the lane markings detector 520 analyzes road image information provided by the sensors 120 via the data receiver 510.

If, at block 702, the lane markings detector 520 determines that the first and second lane markings 220, 230 are not detectable, the method 700 proceeds to block 724.

If, at block 702, the lane markings detector 520 determines that the first and second lane markings 220, 230 are detectable, the method 700 proceeds to block 704.

At block 704, the conditions determiner 530 determines whether the roadway 102 is curved. More specifically, the conditions determiner 530 analyzes curvature of the detected first and second lane markings 220, 230 received from the lane markings detector 520, as discussed above.

If, at block 704, the conditions determiner 530 determines that the roadway 102 is not curved, the method 700 proceeds to block 706.

If, at block 704, the conditions determiner 530 determines that the roadway 102 is curved, the method 700 proceeds to block 724.

At block 706, the conditions determiner 530 determines whether the roadway 102 is inclined. More specifically, the conditions determiner 530 analyzes road image information provided by the sensors 120 via the data receiver 510, as discussed above.

If, at block 706, the conditions determiner 530 determines that the roadway 102 is not inclined, the method 700 proceeds to block 708.

If, at block 706, the conditions determiner 530 determines that the roadway 102 is inclined, the method 700 proceeds to block 724.

At block 724, the conditions determiner 530 determines that the roadway 102 is not suitable for an environmental visibility analysis. More specifically, the conditions determiner 530 determines that the roadway 102 is not suitable for a visibility determination based on the determinations of blocks 702, 704, and/or 706. In other words, if lane markings cannot be detected (block 702), the roadway 102 is curved (block 704), and/or the roadway 102 is inclined (block 706), an environmental visibility analysis is not feasible. The method 700 then returns to block 702.

At block 708, the lane markings detector 520 detects edges of the detected first and second lane markings 220, 230. As discussed above, the lane marking detector 520 analyzes the road image information provided by the sensors 120 via the data receiver 510 using edge detection. The method 700 then proceeds to block 710.

At block 710, the vanishing point detector 540 detects first and second vanishing points 222, 233 of the edge-detected first and second lane markings 220, 230. As discussed above, the vanishing point detector 540 analyzes the edge-detected first and second lane markings 220, 230 and the road image information provided by the sensors 120 via the data receiver 510 to locate the vanishing points 222, 233 in the images captured by the sensors 120. The method 700 then proceeds to block 712.

At block 712, the pixel row determiner 550 determines in which pixel rows 212 the first and second vanishing points 222, 233 are respectively located in the images captured by the sensors 120. As discussed above, the pixel row determiner 550 determines pixel row values 610 of the first and second vanishing points 222, 233. The method 700 then proceeds to block 714.

At block 714, the pixel row averager 560 averages the pixel row values 610 of the first and second vanishing points 222, 233 received from the pixel row determiner 550. As discussed above, the pixel row averager 560 generates an average pixel row value. The method 700 then proceeds to block 716.

At block 716, the domain converter 570 converts the average pixel row value received from the pixel row averager 560 into a distance value in the distance domain. More specifically, the domain converter 570 accesses the domain conversion data 440 stored in the memory 420 and determines the distance value corresponding to determined average pixel, as discussed above. The method 700 then proceeds to block 718.

At block 718, the reconfigurator 580 determines whether the average pixel value received from the pixel row averager 560 and/or the determined distance value received from the domain converter 570 is acceptable. More specifically, the reconfigurator 580 accesses the threshold data 450 stored in the memory 420 and determines whether the average pixel value and/or the determined distance value is below a visibility threshold, as discussed above.

If, at block 718, the reconfigurator 580 determines that the average pixel value and/or the determined distance value is acceptable, the method returns to block 702.

If, at block 718, the reconfigurator 580 determines that the average pixel value and/or the determined distance value is not acceptable, the method proceeds to block 720.

At block 720, the reconfigurator 580 reconfigures camera-dependent road conditions monitoring features. More specifically, the reconfigurator 580 generates a stop request to cease or suspend execution of the camera-dependent road conditions monitoring vehicle features, as discussed above. The method 700 then proceeds to block 722.

At block 722, the feedback generator 590 generates feedback messages for display via the IHU 160 warning a driver of the vehicle 110 of low visibility and/or that one or more road conditions monitoring vehicle features is unavailable for use. As discussed above, the feedback generator 590 generates messages based on the stop request, the comparison of the average pixel value to the threshold data 450, and/or the comparison of the determined distance to the threshold data 450. The method 700 then returns to block 702.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may warn drivers of low-visibility environmental conditions. Further, determining environmental visibility may aid in stopping or suspending execution of camera-dependent road condition monitoring vehicle features in weather conditions unsuitable for such features. Additionally, warning drivers that certain road conditions monitoring vehicle features are unavailable because of low environmental visibility may remind drivers to be vigilant while driving in low-visibility weather. It should also be appreciated that the disclosed apparatus and methods provide a specific solution—determining environmental visibility and making camera-dependent road condition monitoring vehicle features unavailable based on the environmental visibility—to a specific problem—reliance on automated vehicle features during weather that is unsuitable for use of the automated features. Further, the disclosed apparatus and methods provide an improvement to computer-related technology by increasing functionality of a processor to detect lane markings, detect vanishing points of the lane markings, determine an average pixel row value of the vanishing points, convert the average pixel row value into a distance, determine whether to make vehicle features unavailable based on the distance, and generating feedback based on the distance.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a sensor to generate road image information; and
a processor and memory in communication with the sensor and configured to:
detect vanishing points where lane markings are no longer visible in front of the vehicle to the sensor in the road image information;
convert an average pixel row value of the vanishing points to a distance value, wherein the distance value is calculated based on a nonlinear relationship between the average pixel row value and the distance value; and
if the average pixel row value is below a threshold, stop execution of at least one road condition monitoring feature.

2. The vehicle of claim 1, wherein the nonlinear relationship comprises an exponential growth relationship between the average pixel row value and the distance value.

3. The vehicle of claim 1, wherein the processor is configured to look up the average pixel row value in a look up table stored in the memory to determine the distance value, the look up table corresponding pixel row values to distance values.

4. The vehicle of claim 3, wherein the look up table reflects placement and orientation of the sensor, wherein the distance values are recalculated based on changes of the placement and orientation of the sensor and corresponding pixel row values.

5. The vehicle of claim 1, further comprising an infotainment head unit (IHU) and wherein the processor is configured to generate a message for display on the IHU warning a driver that execution of the at least one road condition monitoring feature is stopped.

6. The vehicle of claim 1, wherein:
the lane markings include a first lane marking and a second lane marking;
the vanishing points include a first vanishing point where the first lane marking is no longer visible in front of the vehicle to the sensor and a second vanishing point where the second lane marking is no longer visible in front of the vehicle to the sensor; and
the processor is configured to:
determine a first pixel row value of the first vanishing point;
determine a second pixel row value of the second vanishing point; and
average the first and second pixel row values to generate the average pixel row value.

7. The vehicle of claim 1, wherein the average pixel row value being below the threshold indicates low environmental visibility.

8. The vehicle of claim 1, wherein the at least one road condition monitoring feature executes using the road image information.

9. A method comprising:
generating, with a sensor, road image information;
detecting, with a processor, vanishing points where lane markings are no longer visible in front of a vehicle to the sensor in the road image information;
converting, with the processor, an average pixel row value of the vanishing points to a distance value, wherein the distance value is calculated based on a nonlinear relationship between the average pixel row value and the distance value; and
stopping, with the processor, execution of at least one road condition monitoring feature if the average pixel row value is below a threshold.

10. The method of claim 9, further comprising detecting, with the processor, the lane markings in the road image information.

11. The method of claim 9, wherein converting the average pixel row value to the distance value includes looking up the average pixel row value in a look up table that corresponds pixel row values to distance values.

12. The method of claim 11, wherein the look up table reflects placement and orientation of the sensor in the vehicle, wherein the distance values are recalculated based on changes of the placement and orientation of the sensor and corresponding pixel row values.

13. The method of claim 9, further comprising:
generating, with the processor, a message warning a driver that execution of the at least one road condition monitoring feature is stopped; and
displaying, with the processor, the message on an infotainment head unit (IHU).

14. The method of claim 13, further comprising detecting, with the processor, a first lane marking and a second lane marking; and
wherein:
detecting the vanishing points includes:
detecting a first vanishing point where the first lane marking is no longer visible in front of the vehicle to the sensor; and
detecting a second vanishing point where the second lane marking is no longer visible in front of the vehicle to the sensor; and
converting the average pixel row value to the distance value includes:
determining a first pixel row value of the first vanishing point;
determining a second pixel row value of the second vanishing point; and
averaging the first and second pixel row values.

15. The method of claim 9, further comprising
generating, with the processor, a message warning a driver of low environmental visibility; and
displaying, with the processor, the message on an infotainment head unit (IHU).

16. A system comprising:
a central facility having a database of visibility information;
a dedicated short range communication (DSRC) transceiver disposed in a vehicle and in communication with the database;
a sensor disposed in the vehicle to generate road image information;
a global positioning system (GPS) receiver disposed in the vehicle to generate location information of the vehicle; and
a processor in communication with the DSRC transceiver, the sensors, and the GPS receiver and configured to:
detect vanishing points where lane markings are no longer visible in front of the vehicle to the sensor in the road image information;
convert an average pixel row value of the vanishing points to a distance value, wherein the distance value is calculated based on a nonlinear relationship between the average pixel row value and the distance value; and
if the average pixel row value is below a threshold, stop execution of at least one road condition monitoring feature.

17. The system of claim 16, further comprising a memory disposed in the vehicle and in communication with the processor and wherein the processor is configured to look up the average pixel row value in a look up table stored in the memory to determine the distance value, the look up table corresponding pixel row values to distance values.

18. The system of claim 17, wherein the look up table reflects placement and orientation of the sensor in the vehicle, wherein the distance values are recalculated based on changes of the placement and orientation of the sensor and corresponding pixel row values.

19. The system of claim 16, further comprising an infotainment head unit (IHU) disposed in the vehicle and wherein the processor is configured to generate a message for display on the IHU warning a driver that execution of the at least one road condition monitoring feature is stopped.

20. The system of claim 16, wherein:
the lane markings include a first lane marking and a second lane marking;
the vanishing points include a first vanishing point where the first lane marking is no longer visible in front of the vehicle to the sensor and a second vanishing point where the second lane marking is no longer visible in front of the vehicle to the sensor; and
the processor is configured to:
determine a first pixel row value of the first vanishing point;
determine a second pixel row value of the second vanishing point; and
average the first and second pixel row values to generate the average pixel row value.

* * * * *